(12) United States Patent
Jubert

(10) Patent No.: US 8,749,912 B2
(45) Date of Patent: Jun. 10, 2014

(54) METHOD AND APPARATUS FOR BIPOLAR SERVO MARKS WRITING WITH SELF DC-ERASE

(75) Inventor: Pierre-Olivier Jubert, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 863 days.

(21) Appl. No.: 12/839,482

(22) Filed: Jul. 20, 2010

(65) Prior Publication Data

US 2012/0019951 A1 Jan. 26, 2012

(51) Int. Cl.
*G11B 5/584* (2006.01)
*G11B 21/02* (2006.01)
*G11B 15/04* (2006.01)

(52) U.S. Cl.
USPC .............................. 360/77.12; 360/75; 360/60

(58) Field of Classification Search
None
See application file for complete search history.

(56) References Cited

U.S. PATENT DOCUMENTS

| | | | |
|---|---|---|---|
| 4,663,676 A | 5/1987 | Voegeli | |
| 5,680,268 A | 10/1997 | Hiromi | |
| 6,989,950 B2 * | 1/2006 | Ohtsu | 360/48 |
| 7,190,551 B2 | 3/2007 | Suda | |
| 7,199,957 B2 * | 4/2007 | Rothermel et al. | 360/48 |
| 7,253,986 B2 | 8/2007 | Berman et al. | |
| 7,256,962 B2 * | 8/2007 | Tateishi | 360/121 |
| 7,265,924 B2 | 9/2007 | Shirouzu | |
| 7,319,569 B2 * | 1/2008 | Kira | 360/75 |
| 7,428,120 B2 | 9/2008 | Berman et al. | |
| 7,551,378 B2 | 6/2009 | Eaton | |
| 7,602,578 B2 * | 10/2009 | Tateishi et al. | 360/77.12 |
| 8,310,780 B2 * | 11/2012 | Imaino et al. | 360/75 |
| 2005/0122620 A1 * | 6/2005 | Suda | 360/125 |
| 2007/0047122 A1 | 3/2007 | Czarnecki et al. | |
| 2008/0285171 A1 * | 11/2008 | Tanaka et al. | 360/77.12 |
| 2009/0067087 A1 * | 3/2009 | Dugas et al. | 360/118 |

* cited by examiner

*Primary Examiner* — Andrew L Sniezek
(74) *Attorney, Agent, or Firm* — Schmeiser, Olsen & Watts

(57) ABSTRACT

A method and apparatus for bipolar and self DC-erase write of servo marks. The method includes providing a servo write head having first and second write gaps; and applying a varying current to the servo write head to alternately DC-erase and write sets of servo marks to regions of a servo track of a magnetic storage medium proximate the first and second write gaps, the magnetic storage medium moving with respect to the first and second write gaps. The apparatus includes a bipolar servo erase/write driver configured to generate both negative and positive polarity currents and to generate a varying bipolar current signal and a servo write head having a first write gap and second write gap spaced apart and where the servo write head is an only means for writing servo marks to the magnetic storage medium and for DC-erasing the servo tracks.

28 Claims, 5 Drawing Sheets

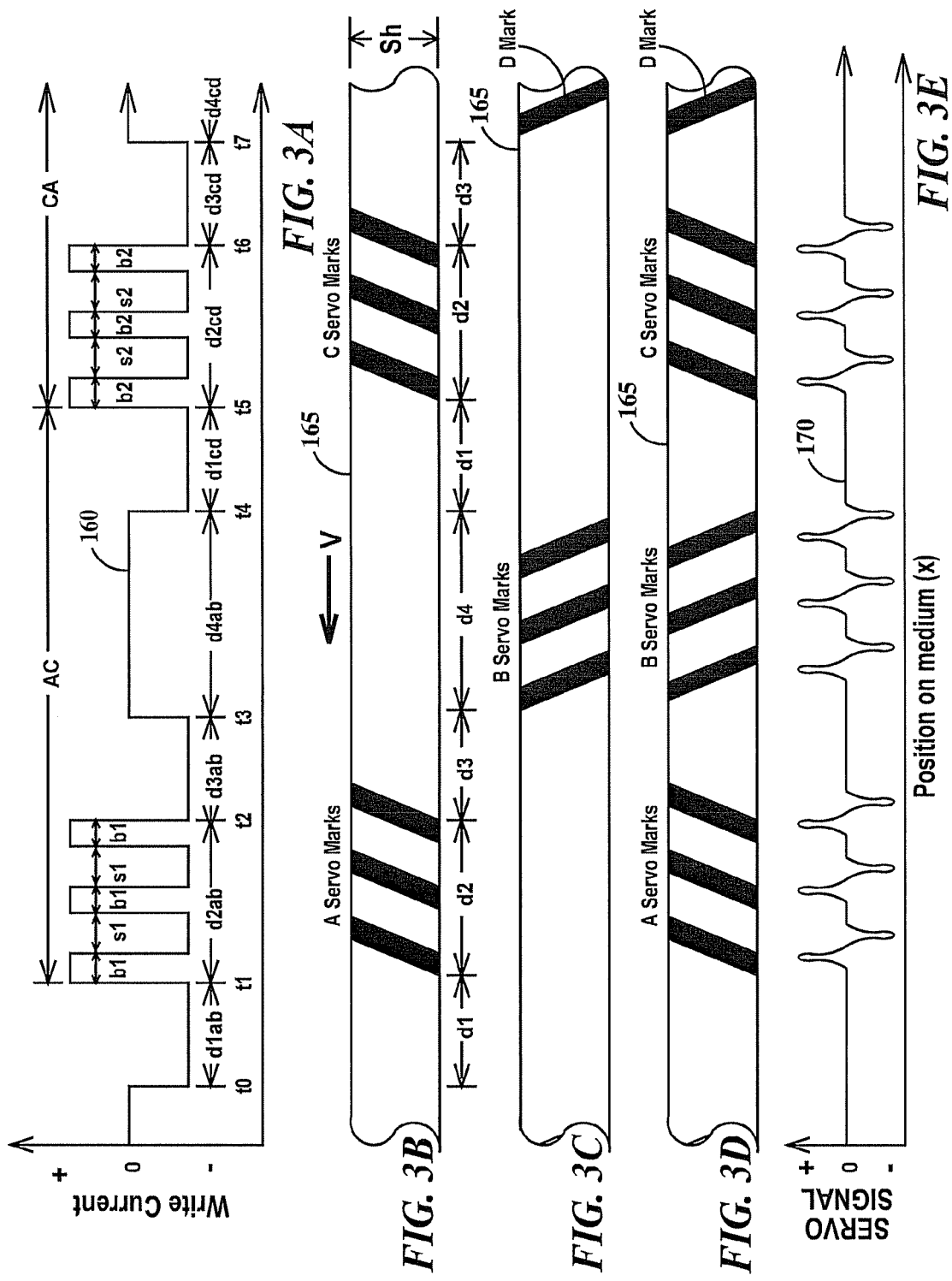

METHOD AND APPARATUS FOR BIPOLAR SERVO MARKS WRITING WITH SELF DC-ERASE

FIELD OF THE INVENTION

The present invention relates to the field of magnetic medium recording; more specifically, it relates to apparatuses and methods for bipolar writing servo marks to a magnetic recording medium using self DC-erase.

BACKGROUND

Magnetic recording systems (such as tape recording systems) record bits of information to a magnetic medium using a write/read head composed of write and read transducers. During both write and read operations, the write and record heads need to be positioned accurately over the data tracks of the magnetic medium. This is achieved by controlling the position of the write/read head in reference to servo-marks prewritten to servo tracks of the magnetic medium. The servo marks are written to a pre-erased medium using a servo write head. The accuracy of writing and reading data strongly depends on how well the pre-erase is performed and how well servo marks are written to the medium. Existing methods either do not produce high signal output or require complex write head structures to properly pre-erase or write the servo tracks and/or at the same time properly pre-erase the data tracks. Accordingly, there exists a need in the art to mitigate the deficiencies and limitations described hereinabove.

SUMMARY

A first aspect of the present invention is a method, comprising: providing a servo write head having first and second write gaps; and applying a varying current to the servo write head to alternately DC-erase and write sets of servo marks to regions of a servo track of a magnetic storage medium proximate to the first and second write gaps, the magnetic storage medium moving with respect to the first and second write gaps.

A second aspect of the present invention is a method, comprising: providing a servo write head having (a) a first write gap and second write gap spaced apart and (b) an induction coil configured to generate respective magnetic fields proximate to the first and second write gaps when a current is applied to the coil by a bipolar servo erase/write driver, the bipolar servo erase/write driver configured to generate both negative and positive polarity currents; generating a varying current signal using the bipolar servo erase/write driver; moving a magnetic storage medium past the first and second write gaps in a linear direction from the first write gap toward the second write gap; and applying the varying current to the coil of the servo write head to alternately DC-erase and write sets of servo marks to regions of a servo track of the magnetic storage medium as the magnetic storage medium moves past the first and second write gaps, the servo track DC-erased and written only by the servo write head.

A third aspect of the present invention is an apparatus, comprising: a bipolar servo erase/write driver configured to generate both negative and positive polarity currents and to generate a varying current signal; a servo write head having a first write gap and second write gap spaced apart and configured to generate respective magnetic fields proximate to the first and second write gaps when the varying signal is applied to servo write head by the bipolar servo erase/write driver; a component that moves a magnetic storage medium past the first and second write gaps in a direction from the first write gap toward the second write gap; and wherein the servo write head is the only means for writing servo marks to the magnetic storage medium and for DC-erasing the servo tracks.

These and other aspects of the invention are described below.

BRIEF DESCRIPTION OF THE DRAWINGS

The features of the invention are set forth in the appended claims. The invention itself, however, will be best understood by reference to the following detailed description of illustrative embodiments when read in conjunction with the accompanying drawings, wherein:

FIG. 3A is a plot of current levels versus medium position or time of a servo write signal 160 to be applied to servo write heads according to embodiments of the present invention;

FIG. 3B illustrates the servo marks written to a magnetic tape medium by the left gap of the servo write head using the signal of FIG. 3A;

FIG. 3C illustrates the servo marks written to a magnetic tape medium by the right gap of the servo write head using the signal of FIG. 3A;

FIG. 3D illustrates the composite servo marks written to magnetic tape medium by the left and right gaps of the servo write head using the signal of FIG. 3A;

FIG. 3E illustrates the servo signal generated by the servo marks of FIG. 3D;

DETAILED DESCRIPTION

There are two conventional methods of writing servo marks to magnetic tape. In the first method, the medium is AC-erased and then uni-polar (i.e., only positive or only negative) current pulses are applied to write the servo marks. This method produces relatively weak servo output signals. In the second method, the magnetic tape is uni-polar (e.g., negatively) DC-erased and then uni-polar (e.g., positive) current pulses are applied to write the servo marks. This method produces a relatively strong servo output signal but requires the use of a DC-erase head and DC-erase driver or permanent magnets to erase the magnetic tape prior to servo writing. An additional problem with the second method is that it is preferable that the data tracks be AC-erased rather than DC-erased for improved data recording. DC-erase methods also DC-erase the data tracks unless the DC-erase head has the same width as the servo write head and is precisely aligned with the servo write head, or unless complex hybrid DC-erase/AC-erase heads are used.

In addition, uni-polar writing implies that the magnetization transition that defines positive (negative) peaks and negative (positive) peaks are defined by the trailing edge and the leading edge of the write gap in the servo write head respectively. Therefore, servo signal peak amplitude and width can be slightly different if the magnetic fields at the trailing edge and at the leading edge differ due to undesired physical differences of the edges of the write gap resulting from the servo head fabrication process.

The present invention is a new bi-polar servo mark writing method for writing timing based servo marks to a magnetic storage medium (e.g., magnetic tape). In one embodiment, the inventive method uses a dual-gap erase/write head and a bi-polar (both positive and negative) DC-erase/write driver and does not use a separate erase head and erase driver for erasing the servo mark regions of the magnetic tape. The dual-gap erase/write head both writes and erases depending on the polarity and timing of the erase/write signal. The erase/write driver can provide positive and negative currents to the dual-gap write head and can be turned off to apply zero current, or to apply near zero current (a near zero current is defined as a positive or negative current that does not change the magnetic state of the medium) at defined times to avoid overwriting the servo marks. Moreover, the inventive method completely eliminates the need for a separate DC-erase of the magnetic medium prior to writing the servo marks, since only a dual-gap servo erase/write head is used to self-DC-erase the servo track and write servo marks as the magnetic tape passes under the dual-gap head. Prior to writing servo marks to the servo track of the magnetic tape, the entire tape (e.g., the servo track regions and data track regions) may be AC-erased.

Figure 1A:
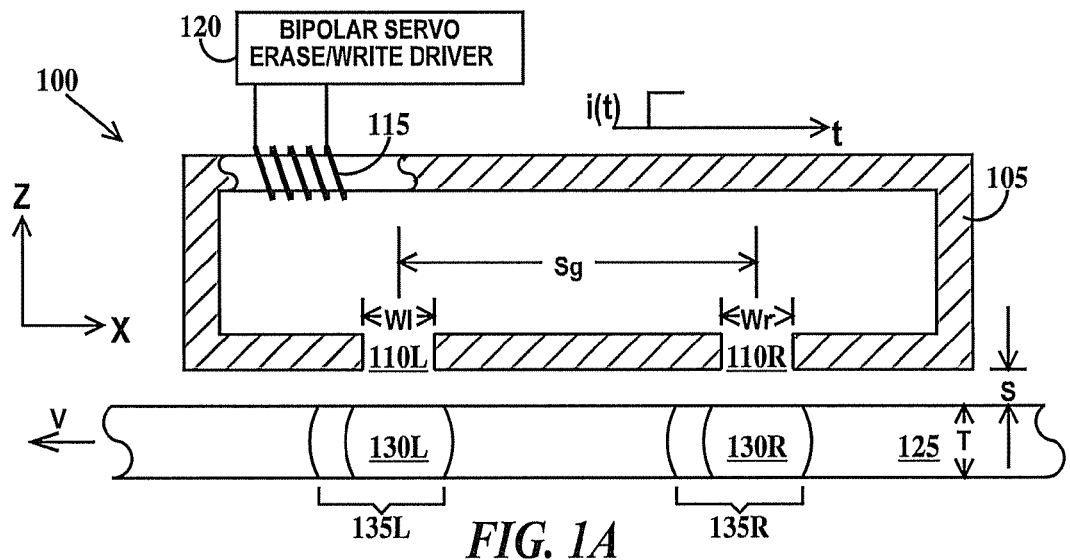
FIG. 1A is a cutaway cross-section view through line 1A-1A of FIG. 1B illustrating a servo write head according to an embodiment of the present invention.
Figure 1B:
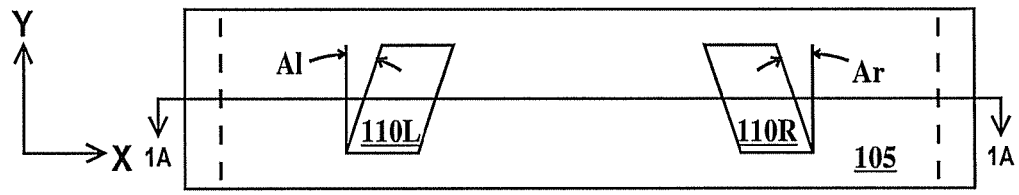
FIG. 1B is a bottom view of the servo write head of FIG. 1A.

FIG. 1A is a cutaway cross-section view through line 1A-1A of FIG. 1B illustrating a servo write head according to an embodiment of the present invention. In FIG. 1A, a dual-gap servo write head 100 includes ferromagnetic body 105 having a left gap 110L and a right gap 110R spaced a center-to-center distance Sg apart and an induction coil 115. Ferromagnetic body 105 need not be formed from iron but has the property of being ferromagnetic. Left and right gaps 110L and 110R have respective widths Wl and Wr. Induction coil 115 is electrically connected to a bipolar DC servo erase/write driver 120, which generates a varying current signal that is applied to induction coil 115. Opposite ends of coil 115 are electrically connected to respective positive and negative current terminals of bipolar servo erase/write driver 120. A magnetic tape 125 having a thickness T and spaced a distance S (in the Z-direction) from dual-gap servo write head 100 moves at a velocity V in the X-direction. When a current i(t) is applied to coil 115, a magnetic write bubble 130L is induced in magnetic tape 125 under gap 110L, thereby magnetizing a region 135L of the magnetic tape. The same current i(t) induces a magnetic write bubble 130R in magnetic tape 125 under gap 110R, thereby magnetizing a region 135R of the magnetic tape. The magnetic regions 135L and 135R are wider (in the X-direction) than the write bubbles because magnetic tape 125 is moving from right to left while the write current i(t) remains, in this example, at a constant positive value.

Regions 135R and 135L will be magnetized when the write field strengths in the X-direction (Hx) generated by the gaps 110L and 110R are greater than coercivity of the magnetic medium (Hc). Each write bubble 130L and 130R has two edges. The leading edge is the rightmost edge and the trailing edge is the leftmost edge. The average width (in the X-direction) of write bubbles 130L and 130R depends on the distance S, the amplitude of the write current, the widths Wl and Wr, and the coercivity of magnetic tape 125. For optimum writing, the widths of write bubbles 130L and 130R should be about the same as the widths of gaps 110L and 110R, respectively. Wl and Wr may be the same or may be different. As can be seen, both regions 135L and 135R are written at the same time. The widths (in the X-direction) of regions 135L and 135R are a function of the velocity V of magnetic tape 125, the time duration of the current i(t), and the write bubble parameters discussed supra.

FIG. 1B is a bottom view of the servo write head of FIG. 1A. In FIG. 1B, gaps 110L and 110R are trapezoidal in shape and are slanted away from the Y-direction by respective angles Al and Ar. Gaps 110L and 110R are slanted toward each other. The magnitudes of angles Al and Ar may be the same or different.

Figure 2A:
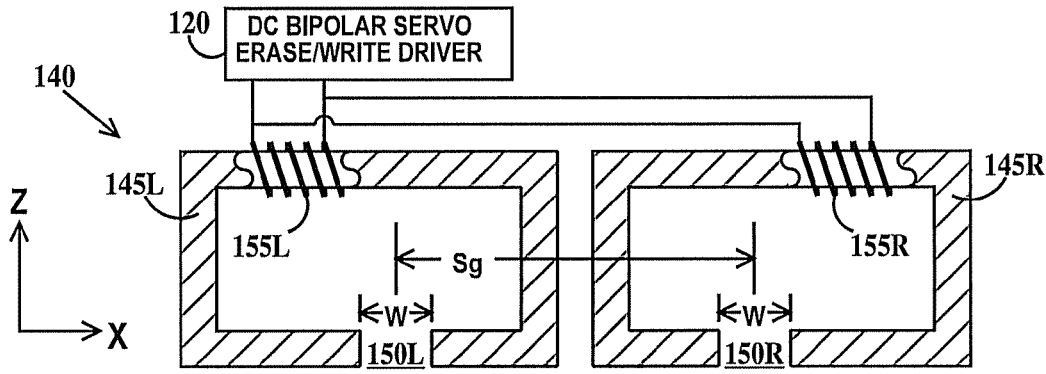
FIG. 2A is a cutaway cross-section view through line 2A-2A of FIG. 2B illustrating a servo write head according to an embodiment of the present invention.
Figure 2B:
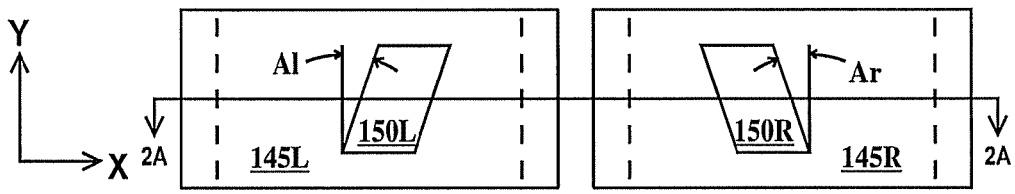
FIG. 2B is a bottom view of the servo write head of FIG. 2A.

FIG. 2A is a cutaway cross-section view through line 2A-2A of FIG. 2B illustrating a servo write head according to an embodiment of the present invention. In FIG. 2A, a dual-gap servo write head 140 includes a first ferromagnetic body 145L having a left gap 150L and a first induction coil 155L and a second ferromagnetic body 145R having a right gap 150R and a second induction coil 155R. Left and right gaps 150L and 150R are spaced the center-to-center distance Sg apart. Left and right gaps 110L and 110R have respective widths Wl and Wr. Induction coils 155L and 155R are electrically connected in parallel (or alternatively in series) to bipolar servo erase/write driver 120 which generates a varying current signal that is applied to induction coils 155L and 155R. Opposite ends of coils 155L and 155R are electrically connected to respective positive and negative current terminals of bipolar servo erase/write driver 120.

FIG. 2B is a bottom view of the servo write head of FIG. 2A. In FIG. 2B, gaps 150L and 150R are trapezoidal and are slanted in the Y-direction by respective angles Al and Ar. Gaps 150L and 150R are slanted toward each other. Angles Al and Ar may be the same or different.

Although magnetic tape 125 is depicted as under servo erase/write heads 100 and 140, alternatively FIGS. 1A and 2A may be rotated 180° about the Y-axis so the magnetic tape passes over the servo erase/write heads in which case FIGS. 1B and 2B would depict top surfaces of the servo erase/write heads.

FIG. 3A is a plot of current levels versus medium position or time of a servo write signal 160 to be applied to servo write heads according to embodiments of the present invention. The X-scale of FIG. 3A may be converted from a medium position scale to a time scale by dividing the position scale by the velocity V of the magnetic tape past the servo write head. When write current is plotted versus the position of the moving magnetic tape the segments, d1*ab*, d2*ab*, d3*ab*, d4*ab*, d1*cd*, d2*cd*, d3*cd* and d4*cd* are used. The positions can also be thought as defining the lengths of sequential segments or distances between positions along the tape. By dividing by V, d1*ab* becomes a time interval between a time t0 and a time t1, d2*ab* becomes an interval between time t1 and a time t2, d3*ab* becomes a time interval between time t2 and a time t3, d4*ab* becomes a time interval between time t3 and a time t4, d1*cd* becomes a time interval between time t4 and a time t5, d2*cd* becomes a time interval between time t5 and a time t6, d3*cd* becomes a time interval between time t6 and a time t7, and d4*cd* becomes a time interval between time t7 and a time t8 (not shown). In FIG. 3A, the pulse width in distance d2*ab* is b1 and the space between pulses is s1. The pulse width in distance d2*cd* is b2 and the space between pulses is s2. In one example, b1=b2 and s1=s2.

Magnetic tape passing the servo write head is magnetized when the applied current has sufficient amplitude (either positive or negative). In the present illustration, positive current writes the medium magnetization in the +X-direction and is used for writing servo marks. Negative current writes the magnetization in the −X-direction and is used for DC-erasing the servo tracks. Alternatively, positive currents may be used to erase and negative currents to write.

In terms of tape position, in the distance d1ab the current is negative and DC-erase of the servo track is performed; in distance d2ab, the current alternates (in pulses of controlled time duration) from negative to positive to negative three times (in this example) to write a pair of A and B servo marks and perform DC-erase between consecutive A and B servo marks. Note that the width of the servo marks is defined by the duration of the positive pulses and is independent of the width of the write gap. Similarly, the distance between two marks is defined by the duration of the negative pulses and is independent of the width of the write gap. Moreover, the servo mark edges are defined by the trailing edge of the write gap only. In distance d3ab the write current is negative and DC-erase is performed. In distance d4ab the current is zero or near zero to avoid overwriting the servo marks when the left gap passes over the servo marks written by the right gap. In the distance d1cd the current is negative and DC-erase of the servo track is performed. In distance d2cd, the current alternates (in pulses of controlled time duration) from negative to negative to positive to negative three times (in this example) to write a pair of C and D servo marks. In distance d4cd the current is zero or near zero to avoid overwriting the servo marks when the left gap passes over the servo marks written by the right gap. In distance d3cd the current is negative and DC-erase of the servo track is performed. The same sequence can be repeated for additional A and B servo mark pairs and additional C and D servo marks pairs. In FIG. 3A, the distance AC is measured from the leading edge of the first pulse of the first burst of three pulses to the leading edge of the first pulse of leading edge of the second burst of three pulses. In terms of time, between t0 and t1 the current is negative and DC-erase of the servo track is performed; between time t1 and t2, the current alternates from negative to positive to negative three times to write a pair of A and B servo marks and perform DC-erase between consecutive A and B servo marks. Between time t2 and t3 the write current is negative and DC-erase is performed. Between t3 and t4 the current is zero or near zero to avoid overwriting the servo marks when the left gap passes over the servo marks written by the right gap. Between t4 and t5 the current is negative and DC-erase of the servo track is performed. Between t5 and t6 the current alternates from positive to negative to positive to write a pair of C and D servo marks. Between t6 and t7 the current is negative and DC-erase of the servo track is performed. Between t7 and t8 (the next t0) the current is zero or near zero to avoid overwriting the servo marks when the left gap passes over the servo marks written by the right gap. The same sequence can be repeated for additional A and B servo mark pairs and additional C and D servo marks pairs.

FIG. 3B illustrates the servo marks written to a magnetic tape medium by the left gap of the servo write head using the signal of FIG. 3A. FIG. 3C illustrates the servo marks written to a magnetic tape medium by the right gap of the servo write head using the signal of FIG. 3A. FIG. 3D illustrates the composite servo marks written to magnetic tape medium by the left and right gaps of the servo write head using the signal of FIG. 3A. In FIGS. 3B, 3C and 3D servo marks are illustrated by the solid black trapezoids. In FIG. 3B, a servo mark track 165 illustrates the position of the A and C servo marks. Servo marks B and D are not illustrated. Distances d1, d2, d3 and d4 associated with the A servo marks are the same as the d1ab, d2ab and d3ab and d4ab distances of FIG. 3A, and distances d1, d2, d3 and d4 associated with the C servo marks are the same as the d1cd, d2cd and d3cd and d4cd distances of FIG. 3A. In FIG. 3C, the position on track 165 of servo marks B is illustrated with the start of servo marks D. Servo marks A and C are not illustrated. In FIG. 3D, servo marks A, B and C are illustrated and the start of servo marks D is illustrated. Also, the number of servo marks in the AB servo mark pairs may be different from the number of servo marks in the CD servo mark pairs.

FIG. 3E illustrates the servo signal generated by the servo marks of FIG. 3D. In FIG. 3E, a servo signal 170 generated by reading servo marks A, B and C are plotted versus the corresponding position on the medium as in FIGS. 3A through 3E.

Since the sequence of servo mark pairs AB-CD-AB-CD-etc. is written with two gaps, it is important to apply the correct sequence of current changes and polarities to prevent overwriting the B and D servo-marks with the left gap of the servo writer. In addition, self-DC-erase (i.e., full DC-erase between A-B, B-C, C-D, D-A etc. servo marks with the use of a single servo write head) can be achieved with the correct timing of sequence of currents but this adds restrictions on servo mark pattern achievable as discussed infra.

The waveform of servo write signal 160 can be designed as follows:

From FIGS. 3A through 3D the following two equations can be defined:

$$AC = d2ab + d3ab + d4ab + d1cd \quad (1)$$

$$CA = d2cd + d3cd + d4cd + d1ab \quad (2)$$

With d1ab, d3ab, d1cd and d3cd as unknowns, there are eight conditions for full self DC-erasing of the servo track with no overwriting of servo marks. These conditions are given by the inequalities in Table I:

TABLE I

| | In order that: | The following condition must be satisfied: |
|---|---|---|
| 1 | There be no overwrite of B marks after d3ab | d3ab < Sg − [(Sh/2)*(tan(Al) + tan(Ar))] − d2ab − Wl |
| 2 | There be full DC-erase between marks A and B | d1ab + d3ab > Sg + [(Sh/2)*(tan(Al) + tan(Ar))] − d2ab − Wl |
| 3 | There be full DC-erase between marks B and C | d3ab + d1cd > AC − Sg − Wr + [(Sh/2)*(tan(Al) + tan(Ar))] − d2ab |
| 4 | There be no overwrite of B marks after d4ab | d1cd < AC − Sg − [(Sh/2)*(tan(Al) + tan(Ar))] − d2ab |
| 5 | There be no overwrite of D marks after d3cd: | d3cd < Sg − [(Sh/2)*(tan(Al) + tan(Ar))] − d2cd − Wl |
| 6 | There be full DC-erase between marks C and D | d1cd + d3cd > Sg + [(Sh/2)*(tan(Al) + tan(Ar))] − d2cd − Wl |
| 7 | There be full DC-erase between marks D and A | d3cd + d1ab > CA − Sg − Wr + [(Sh/2)*(tan(Al) + tan(Ar))] − d2cd |
| 8 | There be no overwrite of D marks after d4cd | d1ab < CA − Sg − [(Sh/2)*(tan(Al) + tan(Ar))] − d2cd |

Where:
  Sg is the center-to-center distance between the left and right gaps (see FIGS. 1A and 2A);
  Wl is the width of the left gap in an X-direction;
  Wr is the width of the right gap in the X-direction;
  Al is the angle of the left gap slanted away from the Y-direction;
  Ar is the angle of the right gap slanted away from the Y-direction; and
  d1ab, d2ab, d3ab, d4ab, d1cd, d2cd, d3cd and d4cd are sequential segments along the magnetic tape in the X-direction where:

in segment d1ab the current is negative;

in segment d2ab the current pulses from negative to positive and back to negative N times, where N is a positive integer equal to or greater than one where:

in segment d3ab the current is negative;

in segment d4ab the current is zero or near zero;

in segment d1cd the current is negative;

in segment d2cd the current pulses from negative to positive and back to negative N times;

in segment d3cd the current is negative; and in segment d4cd the current is zero or near zero;

Sh is the width of the servo track in the Y-direction; and the X-direction is defined as the direction of movement of the magnetic storage medium (e.g., magnetic tape) from the right gap to left gap and the Y-direction is defined as a direction perpendicular to the X-direction.

Alternatively, in order to make the number of servo marks in the AB servo mark pairs different from the number of servo mark pairs in the CD pairs, instead of pulsing N times in each of distances d2ab and d2cd, N1 pulses are applied in distance d2ab to write the AB marks and N2 pulses are applied in distance d2cd to write the CD servo marks. Both N1 and N2 are positive integers greater than one with N1 not equal to N2.

Figure 4:
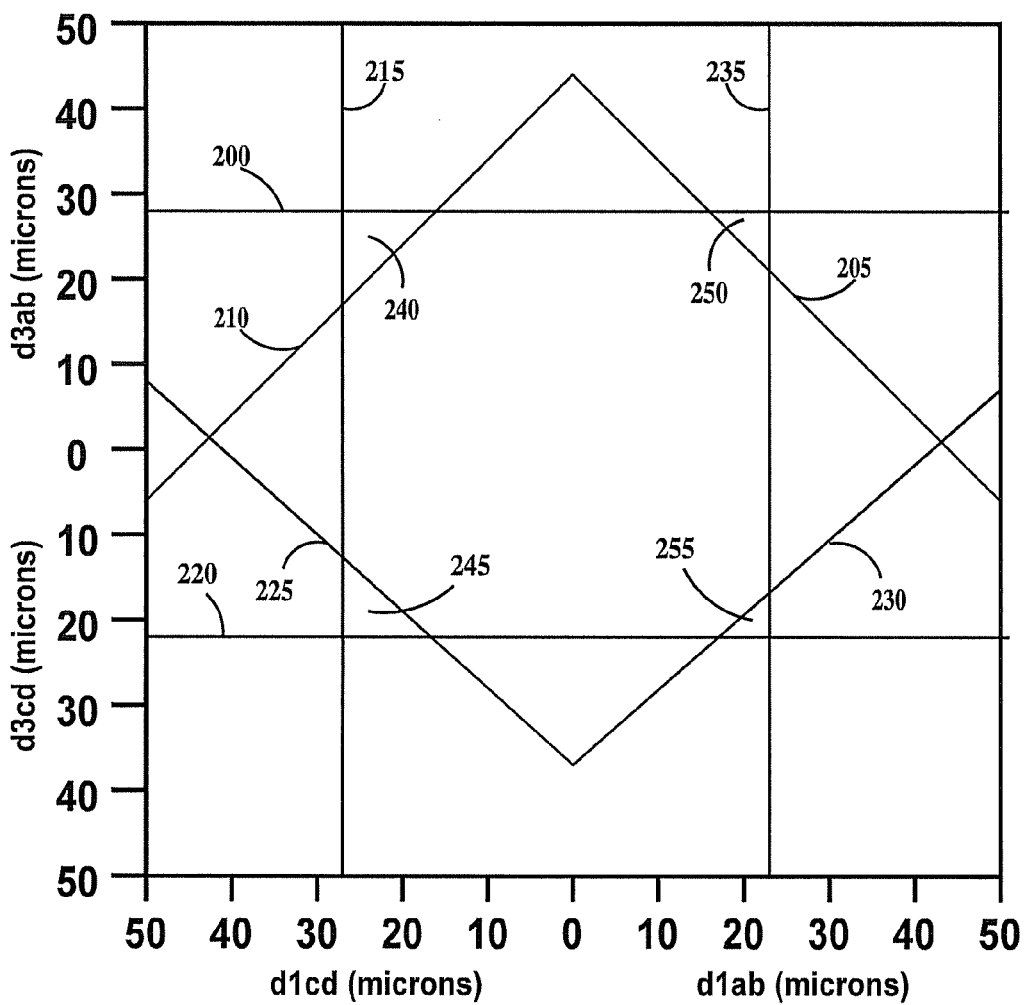
FIG. 4 is a first exemplary graphical solution for conditions under which the embodiments of the present invention may be practiced with self DC-erasing and no overwrite of the servo track.

FIG. 4 is a first exemplary graphical solution for conditions under which the embodiments of the present invention may be practiced with self DC-erasing and no overwrite of the servo track. In FIG. 4, the values of TABLE II have been substituted into the conditional expressions of TABLE I to produce the plots of FIG. 4.

TABLE II

| Parameter | Symbol | Value |
| --- | --- | --- |
| Sg Distance | AB or Sg | 50 μm |
| Angle of left gap | Al | 6° |
| Angle of right gap | Ar | 6° |
| Left write gap | Wl | 0.3 μm |
| Right write gap | Wr | 0.3 μm |
| Servo track width | Sh | 90 μm |
| AC distance | AC | 100 μm |
| CA distance | CA | 100 μm |
| Servo pulse width (b of FIG. 3A) | Together | 2 μm |
| Number of pulses in A and B bursts | these | 4 |
| Number of pulses in C and D bursts | allow | 5 |
| Pulse to pulse distance for A and B bursts (s1 of FIG. 3A) | evaluation of d2ab | 4 μm |
| Pulse to pulse distance for C and D bursts (s2 of FIG. 3A) | and d2cd | 4 μm |

In FIG. 4, condition (1) is plotted by line 200, condition (2) is plotted by line 205, condition (3) is plotted by line 210, condition (4) is plotted by line 215, condition (5) is plotted by line 220, condition (6) is plotted by line 225, condition (7) is plotted by line 230, and condition (8) is plotted by lines 235. Regions 240, 245, 250 and 255 are regions where trailing edge servo writing with self-DC-erase is achievable. For example, with d1ab=d1cd=22 μm, d3ab=25 μm and d3cd=20 μm all conditions are satisfied.

Figure 5:
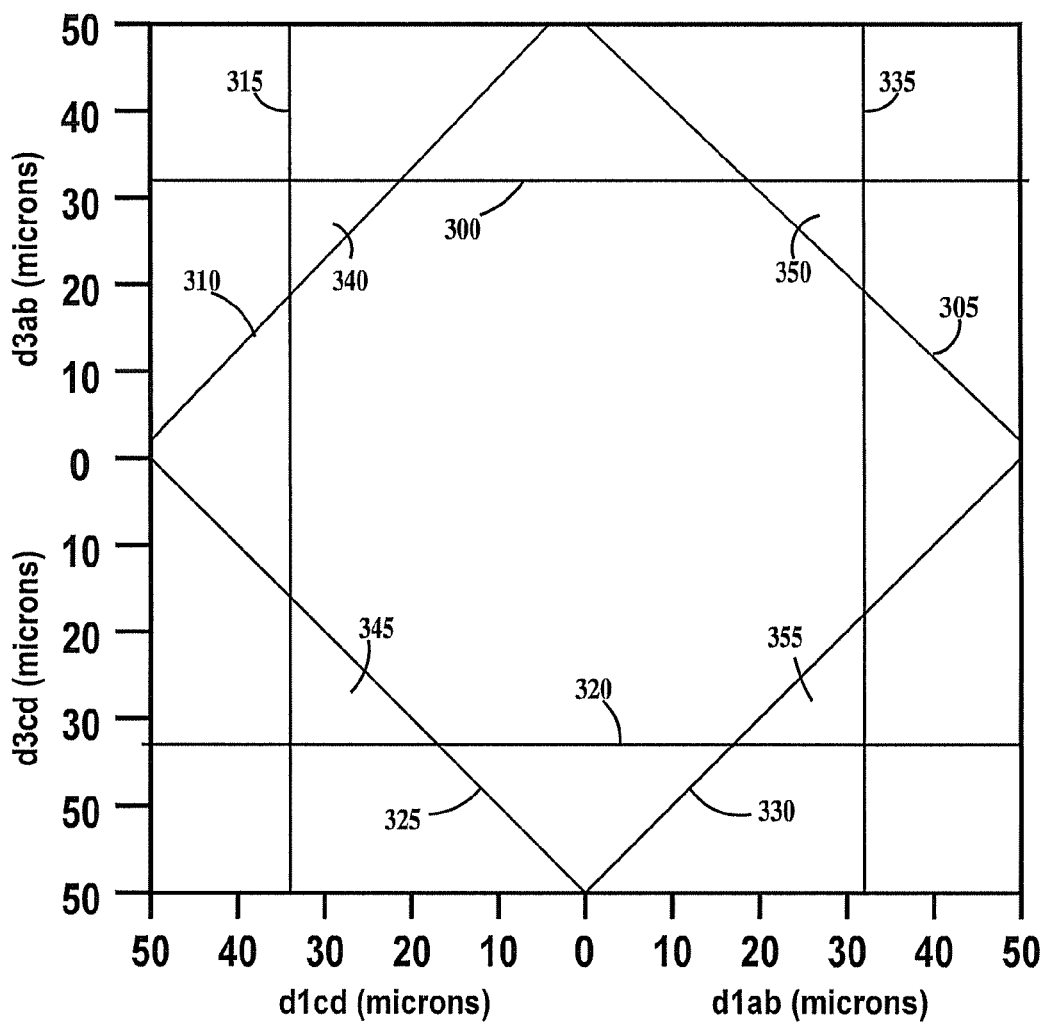
FIG. 5 is a second exemplary graphical solution for conditions under which the embodiments of the present invention may be practiced with self DC-erasing and no overwrite of the servo track.

FIG. 5 is a second exemplary graphical solution for conditions under which the embodiments of the present invention may be practiced with self DC-erasing and no overwrite of the servo track. In FIG. 5, the values of TABLE III have been substituted into the condition expressions of TABLE I to produce the plots of FIG. 4.

TABLE III

| Parameter | Symbol | Value |
| --- | --- | --- |
| Sg Distance | AB | 50 μm |
| Angle of left gap | Al | 6° |
| Angle of right gap | Ar | 0° |
| Left write gap | Wl | 0.3 μm |
| Right write gap | Wr | 0.3 μm |
| Servo track width | Sh | 180 μm |
| AC distance | AC | 100 μm |
| CA distance | CA | 100 μm |
| Servo pulse width (b of FIG. 3A) | Together | 1 μm |
| Number of pulses in A and B bursts | these | 4 |
| Number of pulses in C and D bursts | allow | 5 |
| Pulse to pulse distance for A and B bursts (s1 of FIG. 3A) | evaluation of d2ab | 2 μm |
| Pulse to pulse distance for C and D bursts (s2 of FIG. 3A) | and d2cdd | 2 μm |

In FIG. 4, condition (1) is plotted by line 300, condition (2) is plotted by line 305, condition (3) is plotted by line 310, condition (4) is plotted by line 315, condition (5) is plotted by line 320, condition (6) is plotted by line 325, condition (7) is plotted by line 330, and condition (8) is plotted by line 335. Regions 340, 345, 350 and 355 are regions where trailing edge servo writing with self-DC-erase is achievable. For example, with d1ab=d1cd=30 μm and d3ab=d3cd=30 μm all conditions are satisfied.

Figure 6:
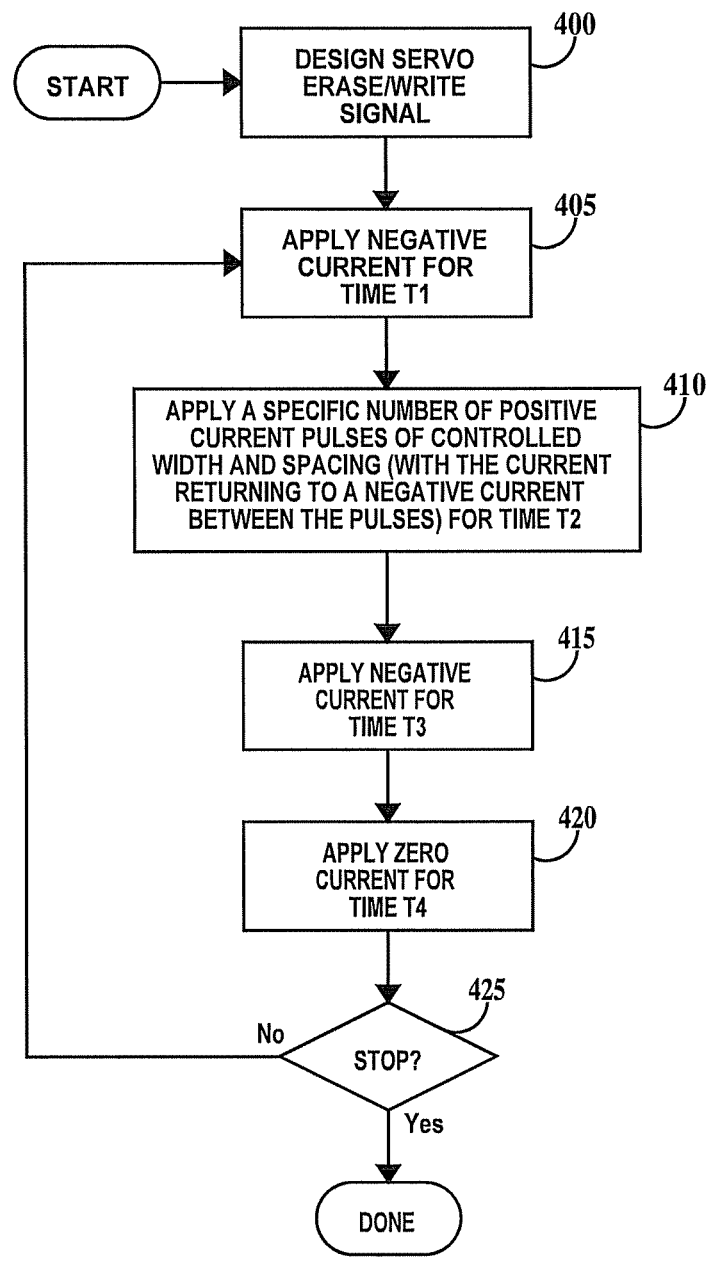
FIG. 6 is a flowchart of the method of writing servo marks with self DC-erase according to embodiments of the present invention.

FIG. 6 is a flowchart of the method of writing servo marks with self DC-erase according to embodiments of the present invention. In the following description, except when referring to numbers of pulses, "negative" may be substituted for "positive" and "positive" substituted for "negative." In step 400, the servo write signal (e.g., 160 of FIG. 3A) is designed using the conditions of TABLE I and equations (1) and (2). The use of a general purpose computer as an aid in the design of the servo write signal is useful. The servo write signal is supplied to the servo write head (e.g., dual-gap servo write head 100 of FIG. 1A or dual-gap servo write head 140 of FIG. 2A) by the bipolar servo erase/write driver (e.g., 120 of FIG. 1A). The servo write signal is a current signal having four distinct phases. During steps 405 through 420, the magnetic tape is moving at a constant velocity past the servo write head. Signal design techniques include graphical and numeric methods.

In step 405, a negative current is applied to erase regions of the servo track across from both gaps of the servo write head for a time T1.

Alternatively, when the number of AB servo marks is to be different from the number of CD servo marks, the negative current is applied for a time T1(1) or T1(2) on alternating passes through the loop 405, 410, 415, 420, 425 and 430. T1(1) may or may not be equal to T1(2).

In step 410, the current is pulsed from negative to positive to negative N times for a time T2. The current is positive during each pulse for a time Tp and negative for a time Tn. T2 is equal to N(Tp)+(N−1)Tn. During time T2, pairs of N servo marks are written to the servo track across from both gaps.

Alternatively, when the number of AB servo marks is to be different from the number of CD servo marks, in step 410, the current is pulsed from negative to positive to negative N1 times for a time T2(1) or N2 times for a time T2(2). The current is positive during each pulse for a time Tp and negative for a time Tn. T2(1) is equal to N1(Tp)+(N1−1)Tn and T2(2) is equal to N2(Tp)+(N2−1)Tn. During time T2(1), pairs of N1 marks are written to the servo track across from both gaps. During time T2(2), pairs of N2 marks are written to the servo track across from both gaps. N1 pulses in time T2(1) or N2 pulses in time T2(2) are applied on alternating passes through the loop 405, 410, 415, 420, 425 and 430. N1 and N2 are positive non-equal integers greater than zero. T2(1) may or may not be equal to T2(2).

In step 415, a negative current is applied to erase regions of the servo track across from both gaps of the servo write head for a time T3.

Alternatively, when the number of AB servo marks is to be different from the number of CD servo marks, the negative current is applied for a time T3(1) or T3(2) on alternating passes through the loop 405, 410, 415, 420, 425 and 430. T3(1) may or may not be equal to T3(2).

In step 420, a zero or near zero current is applied to the servo write head to prevent overwriting of servo marks written in step 410 for a time T4.

Alternatively, when the number of AB servo marks is to be different from the number of CD servo marks, the zero or near zero current is applied for a time T4(1) or T4(2) on alternating passes through the loop 405, 410, 415, 420, 425 and 430. T4(1) may or may not be equal to T4(2).

In step 425 it is determined if writing of servo marks is to be stopped. If not, the method loops back to step 405 otherwise writing of servo marks is terminated.

Whether or not T1(1) is or not equal to T1(2), T2(1) is or not equal to T2(2), T3(1) is or not equal to T3(2), and T4(1) is or not equal to T4(2) depends on satisfying the conditions of TABLE I. For example, in the second example (TABLE III) N1=4 and N2=5 and T1(1)=T1(2) and T3(1)=T3(2).

The alternative when the number of AB servo marks is to be different from the number of CD servo marks may be summarized in terms of T1, T2, T3 and T4 where T1, T2, T3 and T4 remain substantially the same, (ii) T1, T2, T3 and T4 alternate between two different values, or (iii) one or more of T1, T2, T3 and T4 remain the substantially the same and one or more of T1, T2, T3 and T4 alternate between two different values.

Thus, the embodiments of the present invention provide apparatuses and methods for bipolar writing servo marks to a magnetic storage medium using self DC-erase. It should be understood that while magnetic tape has been used in describing the embodiments of the present invention, the embodiments of the present invention are applicable to any moving magnetic storage medium.

The description of the embodiments of the present invention is given above for the understanding of the present invention. It will be understood that the invention is not limited to the particular embodiments described herein, but is capable of various modifications, rearrangements and substitutions as will now become apparent to those skilled in the art without departing from the scope of the invention. Therefore, it is intended that the following claims cover all such modifications and changes as fall within the true spirit and scope of the invention.

What is claimed is:

1. A method, comprising:
providing a servo write head having only a first write gap and a second write gap;
applying a varying current to said servo write head to alternately DC-erase and write sets of servo marks to regions of a servo track of a magnetic storage medium proximate to said first and second write gaps using only said first and second write gaps to both DC erase and write said sets of servo marks, said magnetic storage medium moving with respect to said first and second write gaps; and
periodically reducing the magnitude of said varying current to prevent regions of said servo track written by said first write gap from being overwritten or erased by said second write gap, said magnetic storage medium moving in a linear direction from said first write gap toward said second write gap.

2. The method of claim 1, including:
simultaneously DC-erasing different regions of said servo track as said magnetic storage medium moves past said first and second write gaps.

3. The method of claim 1, including:
simultaneously writing servo marks of said sets of servo marks to different regions of said servo track passing said first and second write gaps.

4. The method of claim 1, wherein said varying current has a first polarity during servo mark writing and an opposite, second polarity during DC-erase, and wherein widths of servo marks of said sets of servo marks are defined by a time duration of said varying current at said first polarity and said widths of said servo marks are independent of widths of said first and second write gaps.

5. The method of claim 1, including:
writing said sets of servo marks in sets of two or more servo marks; and
wherein (i) said varying current has a first polarity during servo mark writing and an opposite, second polarity during DC-erase (ii) distances between said servo marks within each of said set of servo marks are defined by a time duration of said varying current at said second polarity, and (iii) said distances between said servo marks within each of said set of servo marks are independent of widths of said first and second write gaps.

6. The method of claim 1, including:
moving said magnetic storage medium in a linear direction from said first write gap toward said second write gap;
said first write gap having a first leading edge and an opposite first trailing edge;
said second write gap having a second leading edge and an opposite second trailing edge;
said first trailing edge facing said second leading edge; and
wherein edges of servo marks of said sets of servo marks are defined only by said first and second trailing edges.

7. The method of claim 1, wherein applying said varying current includes, in the following order:
(a) for a length of time T1, applying a current of a first polarity to erase regions of the servo track across from said first and second write gaps;
(b) for a length of time T2, pulsing said varying current from said first polarity to an opposite, second polarity and back to said first polarity N times to write a set of N servo marks, where N is a positive integer equal to or greater than one;
(c) for a length of time T3, applying a current of said first polarity to erase regions of the servo track across from first and second write gaps;
(d) for a length of time T4, applying zero current or a current close to zero that does not change the magnetic state of said magnetic medium thereby avoiding overwriting servo marks; and
repeating (a) through (d) multiple times.

8. The method of claim 1, wherein applying said varying current includes, in the following order:
(a) for a length of time T1, applying a current of a first polarity to erase regions of the servo track across from first and second write gaps;
(b) for a length of time T2, pulsing said varying current from said first polarity to a second polarity to said first polarity N times to write a set of N servo marks, said second polarity of an opposite polarity from said first polarity;

(c) for a length of time T3, applying a current of said first polarity to erase regions of the servo track across from first and second write gaps.

(d) for a length of time T4, applying a zero current or a current close to zero that does not change the magnetic state of said magnetic medium to prevent overwriting of servo marks; and repeating (a) through (d) multiple times wherein N alternates between two different positive integers that are greater than one and (i) T1, T2, T3 and T4 remain substantially the same, (ii) T1, T2, T3 and T4 each alternates between respective two different values, or (iii) one or more of T1, T2, T3 and T4 remain substantially the same and one or more of T1, T2, T3 and T4 alternates between respective two different values.

9. The method of claim 1, further including:
AC-erasing said magnetic storage medium prior to said applying said varying current.

10. The method of claim 1, including:
wherein the waveform of said varying current signal is based on the equations:

$$AC = d2ab + d3ab + d4ab + d1cd;$$

$$CA = d2cd + d3cd + d4cd + d1ab;\ and$$

on the inequalities:

$$d3ab < Sg - [(Sh/2)*(\tan(Al) + \tan(Ar))] - d2ab - Wl;$$

$$d1ab + d3ab > Sg + [(Sh/2)*(\tan(Al) + \tan(Ar))] - d2ab - Wl;$$

$$d3ab + d1cd > AC - Sg - Wr + [(Sh/2)*(\tan(Al) + \tan(Ar))] - d2ab;$$

$$d1cd < AC - Sg - [(Sh/2)*(\tan(Al) + \tan(Ar))] - d2ab;$$

$$d3cd < Sg - [(Sh/2)*(\tan(Al) + \tan(Ar))] - d2cd - Wl;$$

$$d1cd + d3cd > Sg + [(Sh/2)*(\tan(Al) + \tan(Ar))] - d2cd - Wl;$$

$$d3cd + d1ab > CA - Sg - Wr + [(Sh/2)*(\tan(Al) + \tan(Ar))] - d2cd;\ and$$

$$d1ab < CA - Sg - [(Sh/2)*(\tan(Al) + \tan(Ar))] - d2cd;\ and$$

where:
Sg is the center-to-center distance between said first and second write gaps;
Wl is the width of said second write gap in an X-direction;
Wr is the width of said first write gap in said X-direction;
Al is the angle the second write gap is slanted away from a Y-direction;
Ar is the angle the first write gap is slanted away from said Y-direction; and
d1ab, d2ab, d3ab, d4ab, d1cd, d2cd, d3cd and d4cd are sequential segment along the magnetic tape in said X-direction where:
in segment d1ab said varying current has a first polarity;
in segment d2ab said varying current pulses from said first polarity to a second polarity and back to said first polarity N1 times, where N1 is a positive integer equal to or greater than one, and said second polarity is an opposite polarity of said first polarity;
in segment d3ab said varying current is said first polarity;
in segment d4ab said varying current is zero or near zero;
in segment d1cd said varying current is said first polarity;
in segment d2cd said varying current pulses from said first polarity to said second polarity and back to said first polarity N2 times, where N2 is a positive integer greater than one and N1 is or is not equal to N2;
in segment d3cd said varying current is said first polarity; and
in segment d4cd said varying current is zero or near zero;
Sh is the width of said servo track in said Y-direction; and
said X-direction is defined as the direction of movement of said magnetic storage medium from said first write gap to said second write gap, and said Y-direction is defined as a direction perpendicular to said X-direction.

11. The method of claim 1, wherein said magnetic storage medium is magnetic tape.

12. A method, comprising:
providing a servo write head having (a) a first write gap and a second write gap spaced apart and (b) an induction coil configured to generate respective magnetic fields proximate to said first and second write gaps when a current is applied to said coil by a bipolar servo erase/write driver, said bipolar servo erase/write driver configured to generate both negative and positive polarity currents;
generating a varying current signal using said bipolar servo erase/write driver;
moving a magnetic storage medium past said first and second write gaps in a linear direction from said first write gap toward said second write gap; and
applying said varying current to said coil of said servo write head to alternately DC-erase and write sets of servo marks to regions of a servo track of said magnetic storage medium as said magnetic storage medium moves past said first and second write gaps, said servo track DC-erased and written only by said servo write head.

13. The method of claim 12, including:
simultaneously DC-erasing different regions of said servo track as said magnetic storage medium moves past said first and second write gaps.

14. The method of claim 12, including:
simultaneously writing servo marks of said sets of servo marks to different regions of said servo track passing said first and second write gaps.

15. The method of claim 12, including:
periodically reducing the magnitude of said varying current to prevent regions of said servo track written by said first write gap from being overwritten or erased by said second write gap.

16. The method of claim 12, wherein said varying current has a first polarity during servo mark writing and an opposite, second polarity during DC-erase, and wherein widths of servo marks within each set of servo marks are defined by a time duration of said varying current at said first polarity and said widths of said servo marks are independent of widths of said first and second write gaps.

17. The method of claim 12, including:
writing said sets of servo marks in sets of two or more servo marks; and
wherein (i) said varying current has a first polarity during servo mark writing and an opposite, second polarity during DC-erase, (ii) distances between said servo marks within each set of servo marks are defined by a time duration of said varying current at said second polarity, and (iii) said distances between said servo marks with in each of said set of servo marks are independent of widths of said first and second write gaps.

18. The method of claim 12, including:
said first write gap having a first leading edge and an opposite first trailing edge;
said second write gap having a second leading edge and an opposite second trailing edge;
said first trailing edge facing said second leading edge; and
wherein edges of servo marks of said sets of servo marks are defined only by said first and second trailing edges.

19. The method of claim 12, wherein applying said varying current includes, in the following order:
(a) for a length of time T1, applying a current of a first polarity to erase regions of the servo track across from said first and second write gaps;
(b) for a length of time T2, pulsing said varying current from said first polarity to an opposite, second polarity and back to said first polarity N times to write a set of N servo marks, where N is a positive integer equal to or greater than one;
(c) for a length of time T3, applying a current of said first polarity to erase regions of the servo track across from first and second write gaps;
(d) for a length of time T4, applying zero current or a current close to zero that does not change the magnetic state of said magnetic medium thereby avoiding overwriting servo marks; and
repeating (a) through (d) multiple times.

20. The method of claim 12, wherein applying said varying current includes, in the following order:
(a) for a length of time T1, applying a current of a first polarity to erase regions of the servo track across from first and second write gaps;
(b) for a length of time T2, pulsing said varying current from said first polarity to a second polarity to said first polarity N times to write a set of N servo marks, said second polarity of an opposite polarity from said first polarity;
(c) for a length of time T3, applying a current of said first polarity to erase regions of the servo track across from first and second write gaps.
(d) for a length of time T4, applying a zero current or a current close to zero that does not change the magnetic state of said magnetic medium to prevent overwriting of servo marks; and
repeating (a) through (d) multiple times wherein N alternates between two different positive integers that are greater than one and (i) T1, T2, T3 and T4 remain substantially the same, (ii) T1, T2, T3 and T4 each alternates between respective two different values, or (iii) one or more of T1, T2, T3 and T4 remain substantially the same and one or more of T1, T2, T3 and T4 alternates between respective two different values.

21. The method of claim 12, further including:
AC-erasing said magnetic storage medium prior to said applying said varying current.

22. The method of claim 12, including:
wherein the waveform of said varying current signal is based on the equations:

$AC = d2ab + d3ab + d4ab + d1cd;$ $CA = d2cd + d3cd + d4cd + d1ab;$ and on the inequalities:

$d3ab < Sg - [(Sh/2)*(\tan(Al)+\tan(Ar))] - d2ab - Wl;$ $d1ab + d3ab > Sg + [(Sh/2)*(\tan(Al)+\tan(Ar))] - d2ab - Wl;$ $d3ab + d1cd > AC - Sg - Wr + [(Sh/2)*(\tan(Al)+\tan(Ar))] - d2ab;$ $d1cd < AC - Sg - [(Sh/2)*(\tan(Al)+\tan(Ar))] - d2ab;$ $d3cd < Sg - [(Sh/2)*(\tan(Al)+\tan(Ar))] - d2cd - Wl;$ $d1cd + d3cd > Sg + [(Sh/2)*(\tan(Al)+\tan(Ar))] - d2cd - Wl;$ $d3cd + d1ab > CA - Sg - Wr + [(Sh/2)*(\tan(Al)+\tan(Ar))] - d2cd;$ and $d1ab < CA - Sg - [(Sh/2)*(\tan(Al)+\tan(Ar))] - d2cd;$ and where:
Sg is the center-to-center distance between said first and second write gaps;
Wl is the width of said second write gap in an X-direction;
Wr is the width of said first write gap in said X-direction;
Al is the angle the second write gap is slanted away from a Y-direction;
Ar is the angle the first write gap is slanted away from said Y-direction; and
d1ab, d2ab, d3ab, d4ab, d1cd, d2cd, d3cd and d4cd are sequential segments along the magnetic tape in said X-direction where:
in segment d1ab said varying current has a first polarity;
in segment d2ab said varying current pulses from said first polarity to a second polarity and back to said first polarity N1 times, where N1 is a positive integer equal to or greater than one, and said second polarity is an opposite polarity of said first polarity;
in segment d3ab said varying current is said first polarity;
in segment d4ab said varying current is zero or near zero;
in segment d1cd said varying current is said first polarity;
in segment d2cd said varying current pulses from said first polarity to said second polarity and back to said first polarity N2 times, where N2 is a positive integer greater than one and N1 is or is not equal to N2;
in segment d3cd said varying current is said first polarity; and
in segment d4cd said varying current is zero or near zero;
Sh is the width of said servo track in said Y-direction; and
said X-direction is defined as the direction of movement of said magnetic storage medium from said first write gap to said second write gap, and said Y-direction is defined as a direction perpendicular to said X-direction.

23. The method of claim 12, wherein said magnetic storage medium is magnetic tape.

24. An apparatus, comprising:
a bipolar servo erase/write driver configured to generate both negative and positive polarity currents and to generate a varying current signal;
a servo write head having a first write gap and second write gap spaced apart and configured to generate corresponding magnetic fields proximate to said first and second write gaps to write servo marks to a magnetic storage medium when said varying signal is applied to servo write head by said bipolar servo erase/write driver and to DC-erase said magnetic storage medium when a negative or positive current is applied to said magnetic storage medium;

said bipolar servo erase/write driver further configured to periodically reduce the magnitude of said varying current to prevent regions of said magnetic storage medium written by said first write gap from being overwritten or erased by said second write gap;

a component that moves said magnetic storage medium past said first and second write gaps in a direction from said first write gap toward said second write gap; and wherein said servo write head is the only means for writing servo marks to said magnetic storage medium and for DC-erasing said magnetic storage medium.

25. The apparatus of claim 24, wherein said servo write head comprises:

a ferromagnetic body having said first and second write gaps, an induction coil wrapped around said ferromagnetic body between said first and second write gaps, opposite ends of said coil electrically connected to respective positive and negative current terminals of said bipolar servo erase/write driver.

26. The apparatus of claim 24, wherein said servo write head comprises:

a first ferromagnetic body having said first write gap, a first induction coil wrapped around said first ferromagnetic body, opposite ends of said first induction coil electrically connected to respective positive and negative current terminals of said bipolar servo erase/write driver; and a second ferromagnetic body having said second write gap, a second induction coil wrapped around said second ferromagnetic body, opposite ends of said second induction coil electrically connected to respective positive and negative current terminals of said bipolar servo erase/write driver.

27. The apparatus of claim 24, wherein:

said bipolar servo erase/write driver generates, in the order recited, a repeating sequence of:

for a time duration of T0, a current of a first polarity;

for a time duration of T1, currents pulses from said first polarity to a second polarity and back to said first polarity N times, where N is a positive integer equal to or greater than one, said second polarity is an opposite polarity of said first polarity;

for a time duration of T2, said current of said first polarity;

for a time duration of T3, zero current or a current close to zero that does not change the magnetic state of said magnetic medium;

for a time duration of T0, said current of said first polarity;

for a time duration of T1, current pulses from said first polarity to said second polarity and back to said first polarity N times;

for a time duration of T2, said current of said first polarity; and for a time duration of T3, said zero current or said current close to zero.

28. The apparatus of claim 24, wherein:

said bipolar servo erase/write driver generates, in the order recited, a repeating sequence of:

for a time duration of T0(1), a current of a first polarity;

for a time duration of T1(1), current pulses from said first polarity to a second polarity and back to said first polarity N1 times, where N1 is a positive integer equal to or greater than one, and said second polarity is an opposite polarity of said first polarity;

for a time duration of T2(1), said current of said first polarity;

for a time duration of T3(1), a zero current or a current close to zero that does not change the magnetic state of said magnetic medium;

for a time duration of T0(2), said current of said first polarity;

for a time duration of T1(2), current pulses from said first polarity to said second polarity and back to said first polarity N2 times, where N2 is a positive integer equal to or greater than one and N1 is not equal to N2;

for a time duration of T2(2), said current of said first polarity;

for a time duration of T3(2), said zero current or said current close to zero; and T0(1) is or is not equal to T0(2), T1(1) is or is not equal to T1(2), T2(1) is or is not equal to T2(2), and T3(1) is or is not equal to T3(2).

* * * * *